United States Patent
Iltsenko et al.

(10) Patent No.: US 9,797,050 B2
(45) Date of Patent: Oct. 24, 2017

(54) ENERGY-EFFICIENT DIAPHRAGM-ELECTROLYSER

(71) Applicants: Valeri Iltsenko, Tallinn (EE); Nikolay Nayda, Tallinn (EE)

(72) Inventors: Valeri Iltsenko, Tallinn (EE); Nikolay Nayda, Tallinn (EE)

( * ) Notice: Subject to any disclaimer, the term of this patent is extended or adjusted under 35 U.S.C. 154(b) by 0 days.

(21) Appl. No.: 15/055,787

(22) Filed: Feb. 29, 2016

(65) Prior Publication Data
US 2016/0251764 A1    Sep. 1, 2016

(30) Foreign Application Priority Data

Feb. 27, 2015    (EE) .................................. 201500009

(51) Int. Cl.
    C25B 9/08    (2006.01)
    C25B 11/02   (2006.01)
    C25B 15/08   (2006.01)

(52) U.S. Cl.
    CPC ............. *C25B 9/08* (2013.01); *C25B 11/02* (2013.01); *C25B 15/08* (2013.01)

(58) Field of Classification Search
    CPC ............ C25B 9/08; C25B 11/02; C25B 15/08
    See application file for complete search history.

(56) References Cited

U.S. PATENT DOCUMENTS

| 8,298,383 B2 | 10/2012 | Iltsenko et al. |
| 8,568,574 B2 | 10/2013 | Iltsenko et al. |
| 2009/0266702 A1* | 10/2009 | Kambe ................ B01D 59/04 204/157.22 |
| 2009/0266709 A1* | 10/2009 | Iltsenko .............. C02F 1/46109 204/260 |
| 2012/0061254 A1 | 3/2012 | Iltsenko et al. |
| 2012/0168319 A1 | 7/2012 | Iltsenko et al. |
| 2013/0146472 A1 | 6/2013 | Sullivan et al. |
| 2013/0146473 A1 | 6/2013 | Lambert et al. |
| 2015/0218715 A1 | 8/2015 | Iltsenko et al. |

FOREIGN PATENT DOCUMENTS

| EE | P201400004 A | 9/2015 |
| FI | 990954 A | 10/2000 |
| KR | 20110047677 A | 5/2011 |
| RU | 2145940 C1 | 2/2000 |
| RU | 2208589 C2 | 7/2003 |
| RU | 2322967 C2 | 4/2008 |
| WO | 0064816 A1 | 11/2000 |
| WO | 2014113178 A1 | 7/2014 |

* cited by examiner

*Primary Examiner* — Ciel Thomas
(74) *Attorney, Agent, or Firm* — Berggren, Inc.

(57) ABSTRACT

The invention relates to the field of electrochemical production of disinfectants, where a solution of alkaline metals is used as the electrolyte in the anode chamber. The invention offers a new design for electrolyzers, reducing power consumption in the production of disinfectants by known methods. As a result of this invention, power consumed in the production of 1 gram of active chlorine by known methods will be reduced by 20%, and the possibilities for producing disinfectants with active chlorine content 7500 ppm in an electrolyzer without channelling the water into external cooling devices will also expand.

3 Claims, 2 Drawing Sheets

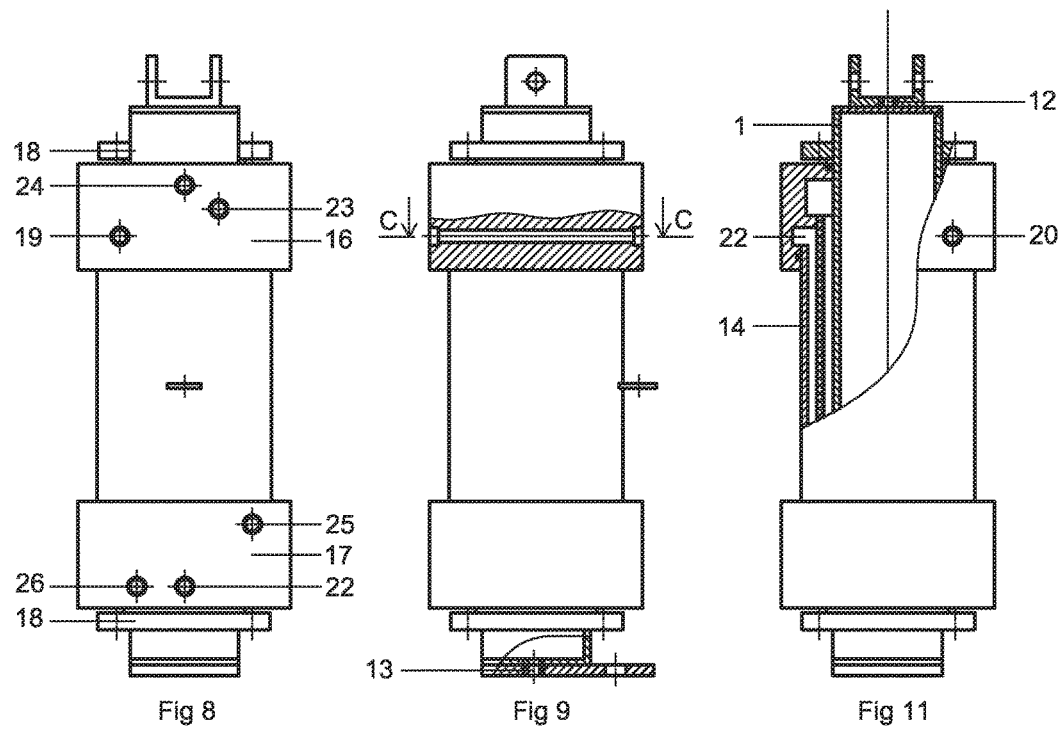
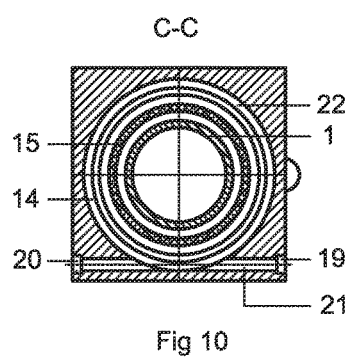

ENERGY-EFFICIENT DIAPHRAGM-ELECTROLYSER

Priority: this application claims priority of Estonian patent application number P201400009 having a filing date of Feb. 27, 2015, and the contents of which are incorporated herein by reference in entirety

TECHNICAL FIELD

The invention relates to the field of devices for electrochemical processing of aqueous solutions and is intended for the production of highly productive plants which generate disinfectants for the disinfection of water and other technological components, such as tools, furniture, premises, ambient air, fodder, soil, sowing materials etc., but also for use in medical institutions and preventive healthcare facilities, water purification plants, food industry, agriculture, gas production and other fields.

BACKGROUND OF THE INVENTION

Known is a large group of electrolysers, which produce up to 16 grams of active chlorine in a solution per hour. These are, for example, the disclosed in patents RU2145940 [1], RU2208589 [2], RU2322967 [3] in which coaxial electrodes are separated by a ceramic diaphragm. Their disadvantage is the low output of active chlorine, entailing the need for a complex hydraulic and electrical coupling of these electrolysers in a high-performance device.

Known is an electrolyser with the productivity of 860 grams of active chlorine per hour, U.S. Pat. No. 8,298,383 [4], which comprises an anode as well as diaphragm assembled in axial alignment. The disadvantage of this electrolyser is its high consumption of electric energy—up to 24 W for the production of 1 gram of active chlorine.

The electrolyser with the output of up to 960 grams of active chlorine per hour, U.S. Pat. No. 8,568,574 [5], is chosen as the closest solution in prior art. Its internal electrode is a tubular cathode closed on both ends with covers. These have an inlet and outlet for fresh water that cools the cathode from the inside and flows to the upper cover of the electrolyser, where it is mixed with the anolyte concentrate flowing from the anode chamber, producing the disinfectant.

The disadvantage of this device is the design of the upper cover of the electrolyser, where the opening in the upper cover for inflow of water is at the same level with the water outlet of the upper cover. As a result, the water entering into the upper cover flows in a circle inside the anode chamber and on its way to the outlet has a possibility to pass deeper into the anode chamber, increasing thereby the electrical resistance of the electrolyte in the anode chamber and making it necessary to consume up to 10.5 W of electric energy for the production of 1 gram of active chlorine. Another disadvantage of this device is the use of current non-conductive threaded covers to seal hermetically the upper and lower end of the tubular cathode. The existence of threaded covers makes it necessary to fit terminals that supply the cathode with voltage only to one end, generally the lower end of the cathode, as otherwise it would not be possible to assemble the electrolyser. However, as voltage is supplied from one end to another end of the cathode that is more than 130 cm long, some of the electric energy is lost in overcoming the resistance over the length of the cathode.

SUMMARY OF THE INVENTION

The objective of the invention is to reduce the consumption of electric energy per 1 gram of active chlorine produced in a highly productive diaphragm electrolyser and to expand the possibility to implement the electrolyser in the production of disinfectant with the concentration of up to 7500 ppm without guiding any water to cooling circuits.

The set task is solved as a result of the following characteristics of the presented cylindrical flow electrolyser, where the design incorporates an upper cover, one of the functions of which is to mix fresh water in the anode chamber that contains a cathode as an inner cylindrical tubular electrode, the inner surface of which is closed at both ends by means of covers: the fresh water inlets in the upper cover of the electrolyser are on that side of the cover, which is opposite to the opening that contains the outlet of disinfectant. At this the inlet of fresh water and outlet of disinfectant are mutually aligned and interconnected with a straight cylindrical channel, which is located between parallel tangents in relation to the cylindrical outer surface of the diaphragm and the internal surface of the groove in the upper cover, meaning that the diameter of the channel is equal or smaller than the length of the groove radius and the radius of the cylindrical outer surface of the diaphragm.

The inner surface of the cathode is closed with round covers produced of a metal of the same grade as the cathode, the diameter of covers shall not exceed the outer diameter of the cathodes, the covers have terminals, the threaded openings for mounting the connector pass through the material of the terminal and the material of the cover. By their measurements the terminals at least at one of the ends of the cathode shall not exceed the external diameter of the cathode.

Therefore the construction of the presented electrolyser allows the fresh water, which enters the upper cover of the electrolyser for the purpose of diluting the anolyte concentrate, to flow in and out from the cover, using the shortest route possible and along the tangent in relation to the cylindrical surface of the diaphragm, mixing on its way with concentrated anolyte. As a result, there is no significant flow of fresh water into the anode chamber, electrolyte is not diluted, the electrical resistance of electrolyte does not increase and increasing the voltage supply of electrolyser is not required. Furthermore, the design of the presented electrolyser gives the possibility to attach massive terminals for electrical connections both to the lower and upper end of the electrolyser, and the terminals at the upper end of the cathode will not hinder the assembly of the electrolyser. As a result, there is less resistance to voltage supplied to the cathode parts that are at a longer distance from the terminal. In comparison with the prototype of welds, the larger surface also reduces resistance and heating of the terminals.

There is a causal relationship between the essential characteristics of the presented electrolyser and the achieved technical result, which becomes manifest in lower consumption of energy required for the achievement of uniform results, when similar electrolysers are replaced with the presented electrolyser for the production of disinfectants by various methods. Lower energy consumption is achieved on account of supplying less voltage to the presented electrolyser in comparison with the analogue to reach the same flow rate. Thereby, when using a method according to U.S. Pat. No. 9,169,570, the supply voltage is 13 V, and 9.5 V with the presented electrolyser; when using the method in U.S. Pat. No. 8,568,574, the required voltage is 10.5 V and 8.0 V respectively, in case of application EE P201400004 6.5 V and 5.2 V respectively. In other words, the changes in electric power consumption in Watts per one gram of active chlorine produced, are as follows:

U.S. Pat. No. 9,169,570—previously 15.4, now 11.2 W/h, −27%

U.S. Pat. No. 8,565,574—previously 11.6, now 8.8 W/h, −24%

EE P201400004—previously 6.4, now 5.1 W/h, −20%

This means reduced energy consumption at least by 20%, depending on the disinfectant production method. Due to the lower energy consumption, the catholyte becomes less hot, which gives the possibility to reduce by 20% the amount of water required for cooling the cathode and then used for mixing with the anolyte concentrate. This allows producing the disinfectant not at 6000 ppm as in case of the application EE P201400004, but 7500 ppm of active chlorine.

The invention also gives the possibility to reduce expenses on the production and operation of diaphragm electrolysis equipment due to the lower cost of assembly parts in supply chains, mainly in electrical power supplies. It will also become possible to use more extensively single-phase networks involving the users of small instruments, such as farms, medical institutions and preventive healthcare facilities, etc. Lower heat losses due to lower consumption of electric energy also has a positive effect on the durability and reliability of appliances.

It is an objective of this invention to provide a diaphragm electrolyser that has an upper cover for the inflow of water to be mixed with concentrated anolyte, which comprises a cathode in the form of a tubular inner electrode, which is sealed at both ends with covers, characterised in that the water inlet opening in the upper cover of the electrolyser is located on that side of the upper cover, which is on the side opposite to the outflow opening of the disinfectant; the water inlet opening and opening of the disinfectant are aligned and interconnected with a straight channel, the lateral surface of which is tangential in relation to the cylindrical surface of the diaphragm, also characterised in that at least one of the covers of the cathode is made of current conductive material, it is fitted with a terminal and transfers voltage to the cathode and by its measurements with the terminal included it is smaller or equal with the external diameter of the cathode.

It is on objective of this invention to provide A diaphragm electrolyser comprising a tubular cathode, an anode, a cylindrical diaphragm, and an upper cover and a lower cover, wherein in the electrolyser an inflow of water to be mixed with concentrated anolyte is allowed in the upper cover, and wherein: the cathode forms a tubular inner electrode, said electrode having a lower end and an upper end and being sealed with the lower cover from the lower end and with the upper cover from the upper end; the upper cover having a water inlet opening and a disinfectant outflow opening on a same axis on opposite sides of the upper cover and being interconnected with a straight channel, the lateral surface of which is tangential in relation to the cylindrical surface of the diaphragm; and at least one of the covers of the cathode is made of current conductive material, and is fitted with a terminal and transfers voltage to the cathode and by its measurements with the terminal included is smaller or equal with the external diameter of the cathode.

BRIEF DESCRIPTION OF THE DRAWINGS

The technical nature and functioning principle of the presented device are explained in figures, where FIG. 1 represents a side view, FIG. 2 represents a top view, and FIG. 3 represents a bottom view;

FIG. 8, FIG. 9, FIG. 10 and FIG. 11 show the assembled electrolyser, more specifically FIGS. 8, 9 11 represent side views, FIG. 11 is a cut-away view and FIG. 10 is a cross sectional view along line C-C shown in FIG. 9.

DETAILED DESCRIPTION OF AN EMBODIMENT OF THE INVENTION

Figure 2:
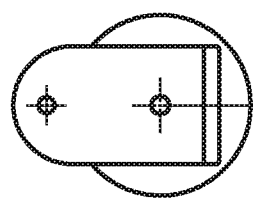
FIG. 1, FIG. 2 and FIG. 3 show the assembled cathode, more specifically
Figure 4:
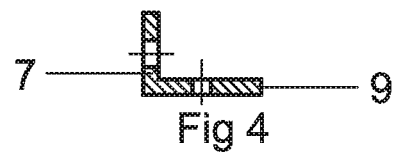
FIG. 4, FIG. 5, FIG. 6 and FIG. 7 show different embodiments of elements of terminals for electrical connections.
Figure 5:
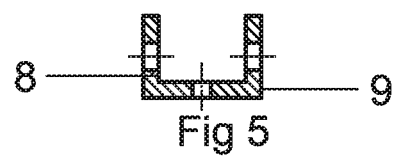
Figure 6:
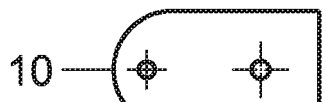
Figure 7:
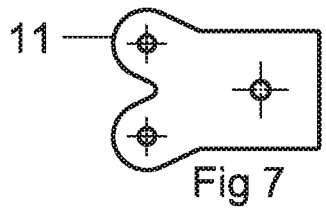
Figure 1:
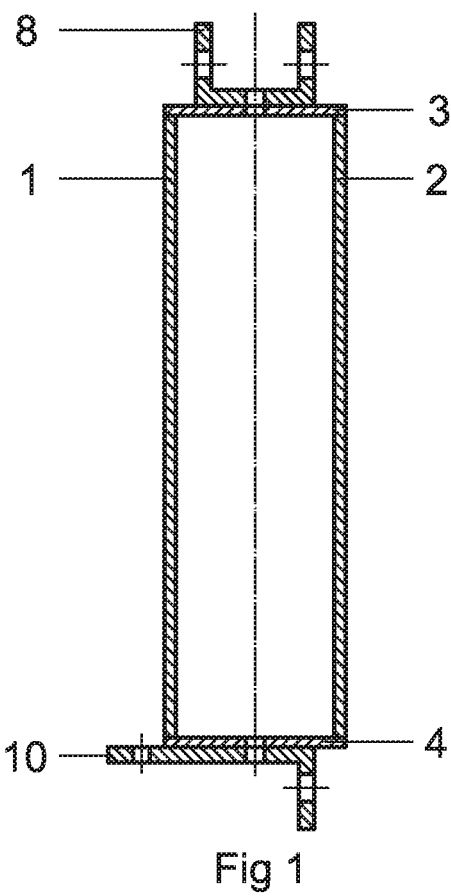
Figure 3:
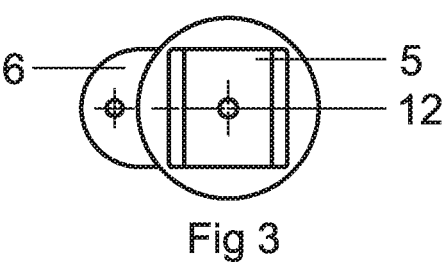

FIGS. 1, 2, 3 show the assembled cathode (1) consisting of the following elements: tubular cylinder (2), upper cover (3) of the cathode, lower cover (4) of the cathode, upper terminal (5), lower terminal (6)—elements, which are interconnected with a weld. In practice, the upper terminal (5) is with an angular (7) or rectangular (8) profile and corresponds to the requirement: the measurements of the surface (9) to be welded to the upper cover (3) as well as the measurements of the upper cover (3) shall not reach beyond the circle formed by the external surface of the tubular cylinder (2). The lower terminal (6) is level with the lower cover (4) and can have the form and dimensions freely selected. In practice, angular (7) as well as rectangular (8) lower terminals, and flat plates (10) or (11) with one or two openings are used for electrical connections. A threaded opening (12) through the terminal (5) and cover (3) channels water out from the inner surface of the cathode. A threaded opening (13) through the terminal (6) and cover (4) channels water in onto the inner surface of the cathode.

FIG. 8, 9, 10, 11 show the presented electrolyser in assembled state, consisting of the following elements: tubular cathode (1), anode (14), diaphragm (15), upper cover (16) of the electrolyser, lower cover (17) of the electrolyser, two flanges (18) for sealing the joints between the covers (16) and (17) of the cathode (1). The upper cover (16) contains an opening (19) for channelling the disinfectant out from the electrolyser. This has an opening (20) for inflowing water to be mixed with concentrated anolyte. Opening (19) and opening (20) are on the same axis and interconnected with a straight channel (21). The upper cover (16) contains a circular horizontal groove (22) with the radius that exceeds the radius of the diaphragm (15),in a size which is not less than the diameter of the channel (21), the horizontal axes of groove (22) run on the same level with the horizontal axis of the channel (21).

The presented electrolyser is connected with direct-voltage power supply and water supply. Fresh water flows through the opening (13) to the inner surface of the cathode (1), the water flows out from the opening (12) and into the opening (20) in the upper cover (16) of the electrolyser. The electrolyte of the cathode chamber, which is between the cathode (1) and diaphragm (15), is passed into the opening (22) in the lower cover (17) of the electrolyser. Catholyte is led out from the electrolyser through the opening (23) and hydrogen through the opening (24). The electrolyte of the anode chamber, which is between the anode (14) and the diaphragm (15), is passed through opening (25). The concentrated anolyte flows from the anode chamber to the upper cover (16) of the electrolyser, fills the groove (22) and flows through the groove (22) towards the disinfectant's outlet (19), mixing with water in the channel (21) on the way and flows out through the opening (19) as a disinfectant with predetermined concentration. The opening (26) has an auxiliary purpose—for draining the catholyte from the cathode chamber prior to flushing the electrolyser with an acid, for entering the flushing acid.

What is claimed is:

1. A diaphragm electrolyser comprising:

a tubular cathode having a lower end and an upper end and being sealed from the lower end with a lower cathode cover, and from the upper end with an upper cathode cover;

an anode;

a cylindrical diaphragm; and an upper electrolyser cover for inflow water to be mixed with concentrated anolyte, and a lower electrolyser cover; wherein the lower cathode cover comprises a lower terminal, and a threated opening through the lower cathode cover and through the lower terminal forming a water inlet to an inner surface of the tubular cathode;

the upper cathode cover comprises an upper terminal, and a threated opening through the upper cathode cover and through the upper terminal forming a water outlet from the inner surface of the tubular cathode; and the upper electrolyser cover having a water inlet opening and a disinfectant outflow opening on a same axis on opposite sides of the upper electrolyser cover and the openings being interconnected with a straight channel, lateral surface of which is tangential in relation to cylindrical surface of the diaphragm.

2. The electrolyser of claim 1, wherein:

either of the upper or lower cathode covers or both of them are made of current conductive material, and welded respectively with the upper terminal or the lower terminal and transfers voltage to the cathode.

3. The electrolyser of claim 2, wherein either the upper cathode cover with the upper terminal welded to it, or the lower cathode cover with the lower terminal welded to it, or both of them have a diameter smaller than or equal to diameter of the tubular cathode.

* * * * *